Oct. 7, 1941.    J. O. COLEMAN    2,258,175
ADJUSTABLE DIAL TEST INDICATOR MOUNTING
Filed April 23, 1940
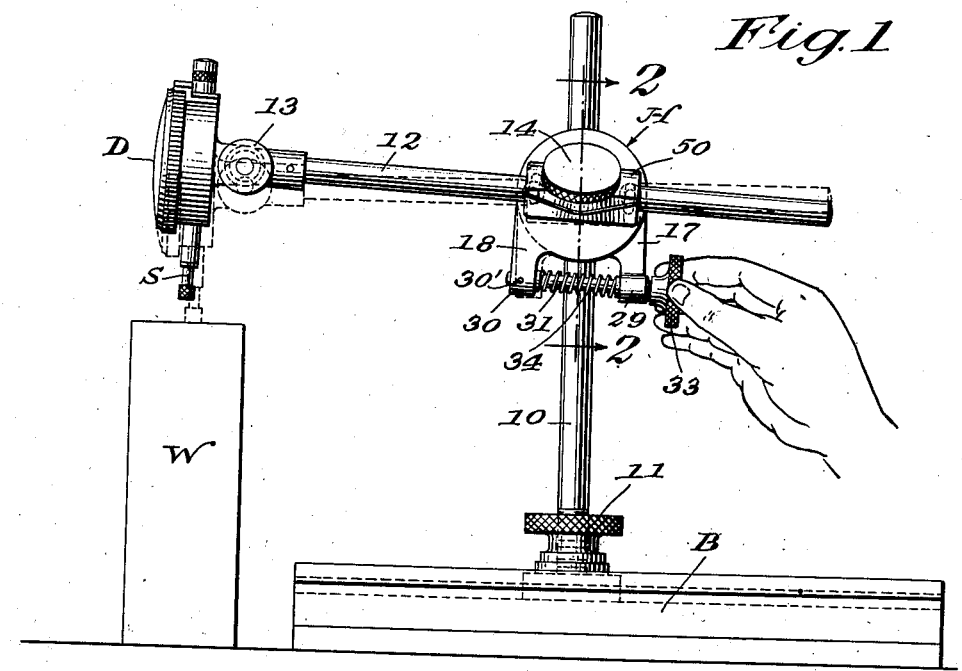
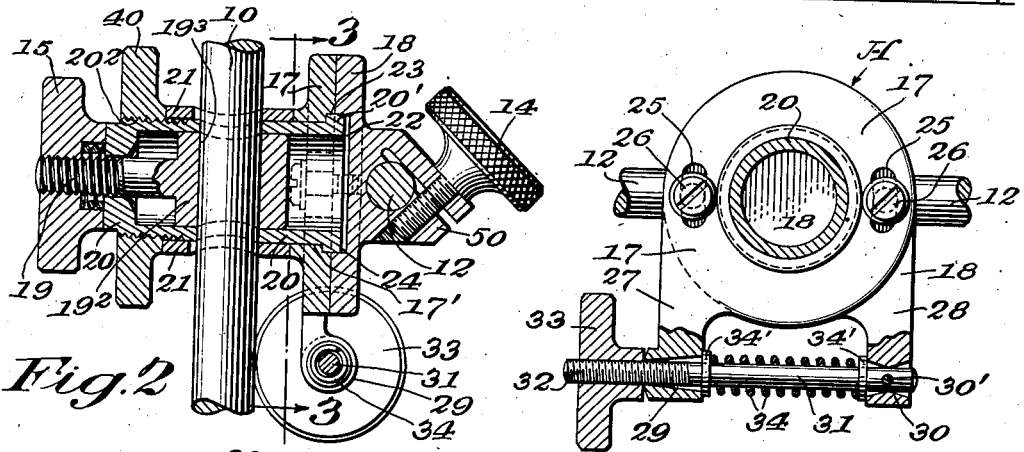
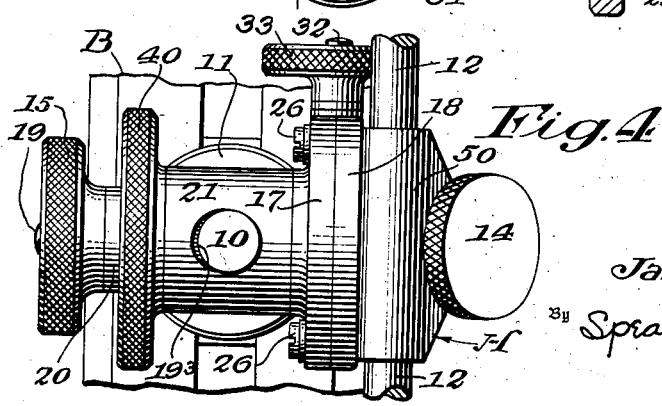
Inventor:
James O. Coleman
By Spear Rawlings & Spear
Attorneys Patented Oct. 7, 1941

2,258,175

UNITED STATES PATENT OFFICE 2,258,175

ADJUSTABLE DIAL TEST INDICATOR MOUNTING

James O. Coleman, Los Angeles, Calif., assignor to The L. S. Starrett Company, Athol, Mass., a corporation of Massachusetts Application April 23, 1940, Serial No. 331,191

8 Claims. (Cl. 248—122)

This invention relates to dial test indicators, and has for its main object to provide such a precision instrument with means for obtaining a fine adjustment of the dial indicator relative to the work to be tested without the necessity of loosening the clamping screw by which the dial indicator is pivoted to its support and painstakingly tilting the dial indicator up and down relative to the work until the rack plunger contacts the same, as was heretofore necessary with the usual dial test indicator.

Where the mechanic had to carefully tilt the dial indicator up and down relative to the work several times in order to make a number of preliminary contacts of the rack plunger with the work before he could be sure that the instrument was properly adjusted for actual calibration of the work, valuable time was not only lost, but there was a real danger of injuring the sensitive rack and pinion mechanism of the dial indicator should the mechanic accidentally drop the dial indicator too rapidly or from too great a height onto the work, thereby striking the rack plunger an unduly hard blow against the work with consequent injury to the delicate mechanism of the instrument.

My invention avoids these disadvantages by enabling the mechanic, by means of a fine adjustment screw, to angularly adjust the supporting arm of the dial indicator until the rack plunger is exactly positioned with reference to the work to be tested.

Other advantages of my invention will appear as the description proceeds. In the accompanying drawing Fig. 1 is a side elevation of a dial test indicator of conventional type equipped with my invention and showing by full and dotted lines the method of accomplishing the fine adjustment of the dial indicator relative to the work.

Figs. 2 and 3 are partial sections on the lines 2—2 and 3—3 of Figs. 1 and 2, respectively, and Fig. 4 is a view looking down upon the post and clamping slide with base and holding rod broken off at the ends to shorten the figure.

I have indicated at B the usual base of a dial test indicator of conventional type equipped with parts constructed according to my invention, and at 10 a usual upright post or standard which is mounted in the usual manner on said base for longitudinal adjustment along it and clamped at any selected position by a usual clamp nut 11.

The dial indicator D and its supporting holding rod 12 are likewise of usual construction. The dial indicator is pivotally mounted in the usual manner on the forward end of the holding rod 12 so as to be capable of being tilted about a transverse axis relative to said holding rod which usually occupies a generally horizontal position. The indicator is clamped in adjusted position by the usual clamp 13.

Thus far the construction is conventional. It is likewise conventional in respect to the idea of mounting the holding rod 12 on the standard 10 for vertical and longitudinal adjustments relative to it and for rough angular adjustment relative thereto. However, my improved means for mounting the holding rod on the post or standard and for providing for and holding these several adjustments exhibits novelty in its own specific structure and broad novelty in its combination with the means for effecting the fine angular adjustment of the indicator holding rod relative to the work.

The holding rod 12 is adjustably mounted on the standard 10 by means of a slidable snug or head indicated generally as H. The usual longitudinal adjustment of the holding rod 12 relative to the standard 10 is permitted or held by the lock screw 14 in the slotted gage rod bracket 50. The usual vertical adjustment of the slidable snug or head H relative to the standard 10 is permitted and held by the upright snug nut 15, and the usual rough angular adjustment of the head relative to the standard is permitted and held by the clamp block 19².

The snug or head H comprises a back plate 17, a carrier plate 18 for the holding rod 12, a clamp bolt 19, clamp nut 15, a clamp bushing 20 having a flange 20' and threaded at its opposite end as at 20² to receive the carrier clamp nut 40 which draws the back plate 17 up against the opposing end of the clamp sleeve 21. The clamp bolt 19 has a cylindrical block 19² apertured as at 19³ to receive the upright or standard 10.

The plates 17 and 18 are disposed in faced abutment. The plate 17 has a central opening 17' to accommodate the clamp bushing 20, clamp bolt 19 and clamp sleeve 21. The inner or abutting faces of each of these plates are provided respectively with an annular groove 22 and a coinciding annular recess 23 which groove and recess together define an annular recess or pocket, when the plates are assembled, within which the externally shouldered head 24 of the clamp bushing 20 is lodged.

The plate 18 is capable of limited rotation relative to the plate 17 to cause a limited rocking of the rod clamp to make fine adjustment or successive contacts of the spindle dial indicator D relative to the work as suggested at W.

For this purpose the plate 17 is provided at either side of its central opening with an elongated vertically disposed slot 25. Screws or equivalent fastenings 26 are entered in said slots with their heads bearing against the outer face of the plate 17 and their threaded ends received in holes tapped in the abutting face of the plate 18.

The plate 17 is provided with a depending arm 27 at its rear edge and the plate 18 is provided with a depending arm 28 at its forward edge. The arms 27 and 28 terminate in alined bearing portions 29 and 30, respectively, provided with tapered openings within which is mounted an adjusting screw 31. The forward end of the screw 31 is pinned as at 30' within the bearing 30. Its rear portion is threaded as at 32 to coact with the threaded portion of an adjusting nut 33 assembled thereon in rear of the arm 27. Surrounding the screw 31 is a coil spring 34 reacting at its ends against clevis washers 34' over the bearing portions 29 and 30.

By rotating the nut 33 along the screw against the action of the spring 34 into abutment with the rear edge of the arm 27, pressure is brought against the plate 17, tending to swing it downwardly. This movement is transmitted through the screws 26 to the plate 18 to which said screws are anchored and said plate is thereby rotated forwardly a limited distance, i. e. the length of the slots 25, to accomplish a fine adjustment of the dial indicator towards the work, or to make successive feeler contacts of its spindle end with a surface being checked. When the nut 33 is rotated in the reverse direction the spring 34 reverses the direction of movement of the plate 18 by reacting against the bearing 27 of the plate 17.

In effecting this movement of the indicator, as illustrated in Fig. 1 by dotted lines, only the fingers of the workman contact the instrument for a gentle steady rotation of the milled nut. This avoids the possibility of dropping the indicator accidentally or bringing the end of its spindle harshly against a work surface by a convulsive movement of the hand with the danger of damage to the delicate gear train of the indicator works.

My invention also makes it possible to adjust the end of the spindle S of an indicator in close proximity to a surface as in Figure 1 without having it actually rest on it. Contact or repeated contacts may then be made by the yieldable rocking means thus adding an improved technique in test gaging.

My invention provides for new and more versatile mountings for dial test indicators. These may be mounted on the usual smooth faced slotted bases with vertically clamped posts or standards or with the posts or spindles of clamps or other convenient supports.

The head mounted as indicated makes a particularly stable, safe and convenient apparatus for doing fine work rapidly and accurately.

Various modifications in the details of the head, clamps and adjusting means may obviously be produced in following the disclosures as made.

What I therefore claim and desire to secure by Letters Patent is:

1. In a dial gage adjusting fixture, a head, a post clamp, a back plate connected for limited rotatable adjustment relative to said post clamp, a carrier plate mounted for rotative adjustment on said back plate, a gage supporting rod bracket on said carrier plate, and adjusting means between said carrier plate and said back plate effective to produce their limited relative rocking movement, whereby dial gage stem contacts may be made without disturbance of other adjustments.

2. In a dial gage adjusting fixture, a head, a post clamp, a back plate connected for limited rotatable adjustment relative to said post clamp, a carrier plate mounted for rotative adjustment on said back plate, a gage supporting rod bracket on said carrier plate, means for clamping a gage supporting rod in said bracket, a post clamp tightening member threaded on said post clamp, and screw actuated yieldable means for rocking said carrier plate to tilt the supporting rod to lower or raise the spindle of a dial indicator relative to a surface being tested.

3. A supporting fixture for a dial indicator, comprising the combination with a stable base, a post extending vertically therefrom, and a supporting rod for a dial indicator clamped between its ends to said post, of means for permitting and holding vertical and rough and fine arcual adjustments of said rod relative to said post, said means comprising a block apertured to receive said post, means releasably clamping said block to said post, an apertured bushing surrounding said block, a nut engaging one end of said bushing, a rotatable back plate sleeved about said bushing, a rotatable carrier plate disposed in facial abutment to said back plate and having a bracket portion carrying said rod, and means coacting with said plates for effecting limited rotation of said carrier plate relative to said back plate to accomplish fine arcual adjustments of the rod relative to the post.

4. The structure of claim 3, the means for effecting limited rotative adjustment of said plates comprising a depending arm at the rear edge of the back plate and a depending arm at the forward edge of the carrier plate providing alined tapering bearing portions, an adjusting screw adjustable in said bearing portions, the forward end of said screw being pinned in the forward bearing portion and the rear end of said screw being threaded, a nut engaging said threaded end, and a coil spring surrounding said screw and reacting at its ends against said bearing portions.

5. The structure of claim 3, the means for limiting the relative rotation of said plates comprising an elongated slot in said back plate and a projection extending from the inner face of the carrier plate and disposed in said slot.

6. A supporting fixture for a dial indicator, comprising the combination with a stable base, a post extending vertically therefrom, and a supporting rod for a dial indicator clamped between its ends to said post, of means for permitting and holding vertical and rough and fine arcual adjustments of said rod relative to said post, said means comprising a block apertured to receive said post, means releasably clamping said block to said post, an apertured bushing surrounding said block and headed at one end and threaded at its opposite end, a nut engaging the threaded end of said bushing, a rotatable back plate sleeved about said bushing, a sleeve surrounding said bushing and disposed between said back plate and said nut, a rotatable carrier plate disposed in facial abutment to said back plate and having a bracket portion carrying said rod, the abutting faces of said plates being formed to provide a recess within which the head of said bushing is received, and means coacting with said plates for effecting limited rotation of said carrier plate relative to said back plate to accomplish fine arcual adjustments of the rod relative to the post.

7. A supporting fixture for a testing tool, comprising the combination with a post, a tool-carrying rod and a clamp for clamping said rod between its ends to said post, of a pair of facially contacting rotatable plates one of which is carried by said clamp and the other of which is provided with a bracket for carrying said rod, a depending arm at the rear edge of one plate and a depending arm at the forward edge of the other plate providing alined bearing portions, and means comprising an adjusting screw adjustable in said bearing portions for effecting limited rotative adjustment of said plates thereby to move the testing tool in an arcuate path relative to said post.

8. The structure of claim 7, one of said plates having an arcual slot and the other plate having a projection extending from one face thereof and disposed in said slot.

JAMES O. COLEMAN.